Jan. 29, 1957

B. B. STEELE ET AL 2,779,512

POWDER DISPENSER

Filed July 8, 1954

INVENTOR.
BRUCE B. STEELE
AND LEONARD G. SCHANTZ
BY Harold E. Stonebraker

THEIR ATTORNEY

United States Patent Office 2,779,512
Patented Jan. 29, 1957

2,779,512

POWDER DISPENSER

Bruce B. Steele, Rochester, and Leonard G. Schantz, Irondequoit, N. Y.; said Schantz assignor to said Steele Application July 8, 1954, Serial No. 441,992

6 Claims. (Cl. 222—307)

This invention relates to a powder dispenser, and has for its purpose to provide a simple and practical construction of economical design for dispensing accurately measured quantities of powdered coffee from a jar or container, although the structure is equally adaptable to dispensing measured amounts of other powdered material from a container.

A particular purpose of the invention is to provide a construction that is readily adjustable to dispense varied quantities of powdered material at each operation as may be desired, enabling for instance dispensing either a minimum quantity of powdered coffee, a maximum quantity, or an intermediate quantity, depending upon the amount required at a given time.

A further object of the invention is to provide a device that can be constructed of plastic material and includes preferably only three parts which are easily separable for cleaning purposes when necessary, and which are readily adjustable and rotatively movable to vary the amount of powder discharged and to enable repeated dispensing operations by turning the valve alternately in opposite directions through a fixed path, causing successive filling and discharging of the selected measured quantity of powder.

An additional purpose is to afford a novel and extremely efficient form of valve including a valve body and adjustable member, the latter being adjustable endwise of the valve body to vary the capacity of the dispensing pockets, and the valve being alternately rotatable in opposite directions to discharge measured quantities of powder successively.

To these and other ends, the invention consists in the construction and arrangement of parts that will appear clearly from the following description when read in conjunction with the accompanying drawings, the novel features being pointed out in the claims following the specification.

Figure 1:
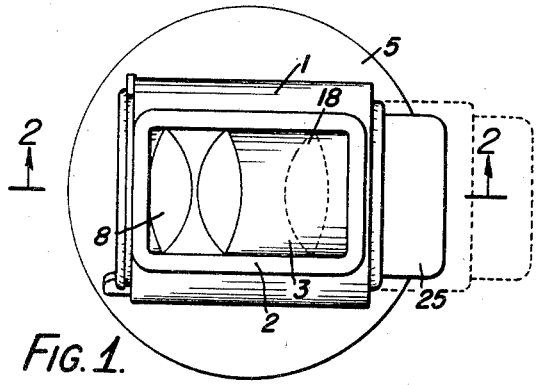
Fig. 1 is a bottom plan view of a structure made in accordance with a preferred embodiment of the invention looking toward the outlet end of the dispenser, the adjustable member of the valve being illustrated in dotted lines in its outermost position as when dispensing a maximum quantity of powder.
Figure 2:
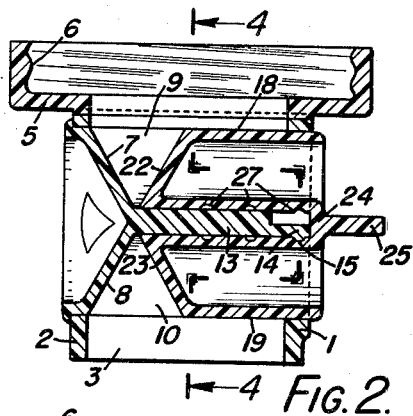
Fig. 2 is a vertical sectional view on line 2—2 of Fig. 1 looking in the direction indicated, with the dispenser in the position which it occupies when attached to a jar or container.
Figure 3:
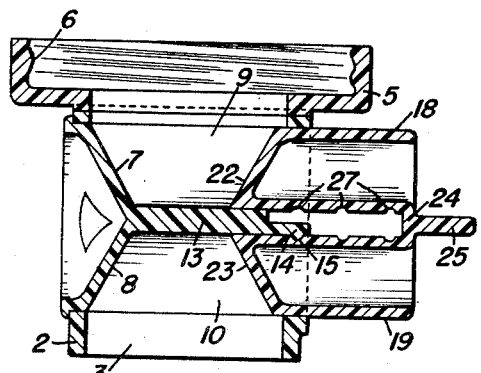
Fig. 3 is a view similar to Fig. 2, showing the adjustable member of the valve in its outermost position corresponding to the dotted line position of Fig. 1.
Figure 4:
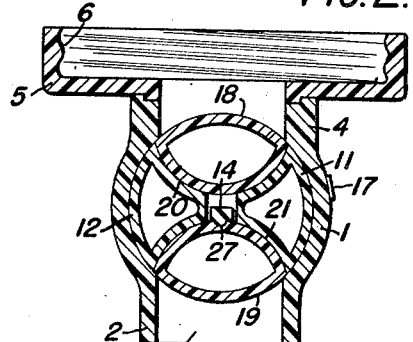
Fig. 4 is a transverse sectional view on line 4—4 of Fig. 2, looking in the direction indicated.
Figures 5, 6, 7:
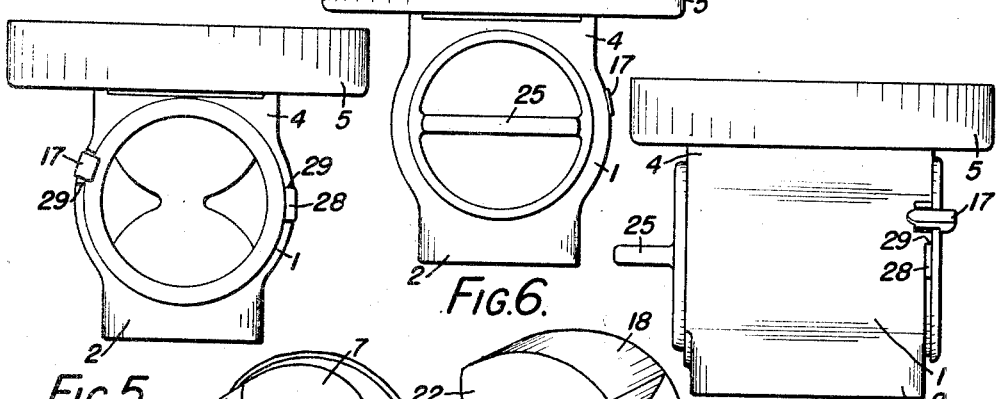
Fig. 5 is a view in end elevation looking from left to right of Fig. 2.
Fig. 6 is an end elevation looking from right to left of Fig. 2.
Fig. 7 is a side elevation with the parts in the position illustrated in Fig. 2.
Figures 8, 9:
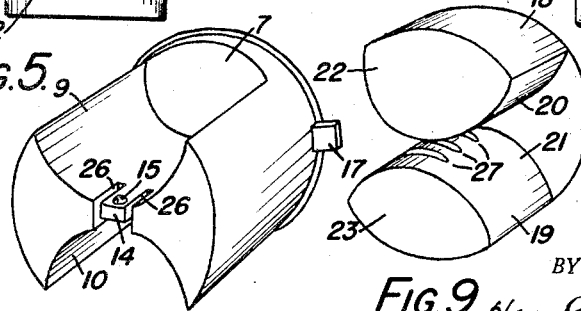
Fig. 8 is a perspective view of the adjustable member of the valve.
Fig. 9 is a perspective view of the valve body.

Referring more particularly to the drawings in which like reference numerals refer to the same parts throughout the several views, the structure comprises a housing consisting of a central portion 1 having cylindrical interior walls to receive the valve, a lower end 2 affording an outlet opening 3, and an upper end 4 to which is attached a collar 5 cemented or otherwise permanently attached to the upper end 4, the collar 5 being internally threaded at 6 to enable it to be secured readily onto the threaded neck of a conventional powdered coffee jar or container. By providing the collar 5 separate from the upper end 4, it is possible to make the collar in different sizes or diameters to fit different sized jars and attach it permanently to the upper end 4 of the housing, which would be made of one standard size, thus effecting a saving in the manufacturing of the device for the various sizes of conventional containers. It will be understood that the collar 5 of a selected size is permanently and rigidly fastened to the upper end 4 of the housing, these parts being preferably made of plastic material and cemented together according to well established procedure in the plastic art.

The central cylindrical portion of the housing, indicated at 1, is open at both sides to receive and accommodate a valve, the parts of which are also made of plastic material to afford a light weight and economical construction. The body of the valve includes oppositely arranged spaced inclined flat inner end walls 7 and 8 and curved side walls 9 and 10 respectively which, together with the inclined walls of the adjustable member to be described presently, constitute two spaced measuring pockets or chambers which alternately receive powder from the container and discharge it into any desired receptacle.

The valve body includes two hollow portions 11 and 12 having spaced cylindrical outer surfaces that fit closely and rotate within the cylindrical opening in the central portion 1 of the housing, the hollow portions 11 and 12 being located between the curved walls 9 and 10 forming the pockets. The valve body also includes a central connecting portion 13 that is provided with a preferably integral and yieldable spring element 14 having a suitable enlargement or button 15 that engages a selected opening in the adjustable member for holding the latter in selected position, depending upon the desired capacity of the measuring pocket. The valve is provided with a lip that abuts the outer surface of the surrounding portion of the housing and limits movement of the valve inwardly of the housing, while the valve is retained in its operative position by means of a spring catch 17 preferably formed integral with the housing and arranged to engage over the outer end of the valve and yieldably hold it in its rotatable position within the housing, while permitting removal of the valve from the housing upon application of a slight endwise pressure.

The adjustable member of the valve includes a bifurcated portion affording opposite members 18 and 19 each of which includes cylindrical outer surfaces that hug closely the adjacent surfaces of the cylindrical opening in the housing and curved inner surfaces 20 and 21 which closely engage the adjacent curved surfaces 9 and 10 defining the pockets on the valve, the bifurcated members terminating in flat inclined walls 22 and 23 which are spaced from and cooperate with the aforementioned flat walls 7 and 8 and the surrounding curved side walls of the valve to afford measuring pockets for the powdered material.

The bifurcated portions of the adjustable member just referred to are formed integral with a connecting end portion 24, while 25 designates a finger portion for turning the valve. The central portion 13 of the valve is provided with transverse cuts or slots 26 adjacent the tongue 14 which is thereby made somewhat yieldable, so that the enlargement or button 15 which it carries may snap into any one of three recesses or openings 27 formed in spaced relation endwise of the adjustable member on the inner curved surfaces 20 and 21 of the members 18 and 19. By gripping the finger portion 25, the adjustable member can be pulled endwise of the valve to any one of three positions, to space the inclined flat walls 22 and 23 at varying distances from the flat walls 7 and 8 and thus vary the capacity of the measuring pocket, the adjustable member being held in adjusted position by the yieldable enlargement or button 15 on the valve engaging and interlocking with the selected opening 27 in the opposed surfaces of the adjustable element.

In this fashion, the adjustable element can be positioned so that the valve may receive and dispense a minimum quantity, an intermediate quantity, or a maximum quantity of coffee or other material. After the device has been attached to a powder container, upon inverting the container, powder falls into the uppermost pocket of the valve and then by engaging the finger portion 25 and rotating the valve through a half turn, the powder is discharged from said pocket into a receptable underneath, while at the same time the opposite or then uppermost measuring pocket which has been turned to the uppermost position receives a charge from the powder container. This operation can be repeated as often as desired, and each time the valve's movement is reversed and rotated through a half turn, the same measured quantity of powder is discharged. If at any time the amount of powder to be dispensed is to be increased or decreased, this is accomplished by engaging finger piece 25 and moving the adjustable member endwise of the valve.

Rotational movement of the valve is limited by cooperating stop means consisting of a stop or lug 28 carried by the valve and arranged to engage alternately two shoulders 29 formed at opposite points on the housing and located in the path of the lug 28. Thus movement of the valve in either direction is limited to bring the measuring pockets into exactly the proper position to receive and dispense the measured amount of powder, and if at any time it is desirable to clean the device, the valve is removable by pushing the finger portion 25 and valve structure endwise in relation to the housing sufficiently to overcome the spring action of latch 17, whereupon the valve body and adjustable member can be readily separated and thoroughly cleansed.

While the invention has been described with reference particularly to the structure shown herein, it is not confined to the details set forth, and this application is intended to cover any modifications or departures that may come within the purposes of the improvement or the scope of the following claims.

We claim:

1. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body removably positioned in said transverse opening by an endwise movement and manually rotatable in opposite directions through half a revolution, said valve body including end walls and a central portion integral therewith, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces, an adjustable one-piece valve member which is removably engaged with said central portion of the valve body and includes an outer end portion with two opposite bifurcated portions projecting laterally therefrom and having two opposite spaced inner curved surfaces which fit closely in the aforesaid pockets of the valve body and two spaced oppositely arranged outer cylindrically curved surfaces which fit closely against said cylindrical walls of the transverse opening in the housing, said bifurcated portions including inner end walls which are spaced from the end walls of said body and the adjustable valve member being slidable endwise of the valve body to different positions thereby varying the capacity of the pockets, cooperating stop means on the housing and valve body limiting turning movement of the valve body to half a revolution, said pockets being alined with said inlet and outlet openings when in their limit positions, and releasable means acting to retain the valve body in the housing.

2. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body removably positioned in said transverse opening by an endwise movement and manually rotatable in opposite directions through half a revolution, said valve body including end walls that seat in said transverse opening against one end of the housing and a central portion integral with said end walls, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces and closed at their ends by said end walls of the valve body, and a one-piece valve member slidably adjustable endwise of said central portion of the valve body and including an outer end portion and two opposite bifurcated portions projecting laterally from said end wall and having two opposite spaced inner curved surfaces which fit closely in the aforesaid pockets of the valve body and two spaced oppositely arranged outer cylindrically curved surfaces which fit closely against said cylindrical walls of the transverse opening in the housing, said bifurcated portions including inner end walls forming one end of an adjustable pocket in the valve body, one of said bifurcated portions having endwise spaced retaining recesses on its inner surface, yieldable retaining means on said central portion of the valve body selectively engaging said recesses and acting to hold the valve member in adjusted position on the valve body, and cooperating stop means on the housing and valve body acting to limit movement of the valve body to half a revolution.

3. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body removably positioned in said transverse opening by an endwise movement and manually rotatable in opposite directions through half a revolution, said valve body including end walls and a central portion integral therewith, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces, an adjustable one-piece valve member which is removably engaged with said central portion of the valve body and includes an outer end portion with two opposite bifurcated portions laterally projecting therefrom and having two opposite spaced inner curved surfaces which fit closely in the aforesaid pockets of the valve body and two spaced oppositely arranged outer cylindrically curved surfaces which fit closely against said cylindrical walls of the transverse opening in the housing, said bifurcated portions having inner end walls which are spaced from the end walls of said valve body and the adjustable valve member being slidable endwise of the valve body to different positions thereby varying the capacity of the pockets, cooperating stop means on the housing and valve body limiting turning movement of the valve body to half a revolution, said pockets being alined with said inlet and outlet openings when in their limit positions, cooperating yieldable means on said valve body and adjustable valve member operating to retain the valve member in adjusted position on the valve body, and yieldable means on the housing engageable with the valve body and acting to hold the valve body in rotatable operating position within the housing.

4. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body positioned in said transverse opening and manually rotatable in opposite directions through half a revolution, said valve body including end walls that seat in said transverse opening against one end of the housing and a central portion integral with said end wall, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces and closed at their ends by said end walls of the valve body, a one piece valve member that is removably engaged with said central portion of the valve body and adjustable endwise thereof, said valve member including an outer end portion and two opposite bifurcated portions projecting laterally from said end wall, said bifurcated portions having two opposite spaced inner curved surfaces which fit closely in the aforesaid pockets of the valve body and two opposite spaced outer cylindrically curved surfaces which fit closely against said cylindrical walls of the transverse opening in the housing, the inner end walls of said bifurcated portions each forming one end of an adjustable pocket in the valve body, yieldable retaining means on the valve body selectively engageable with spaced recesses on the valve member and acting to hold the valve member in adjusted position on the valve body, and cooperating stop means on the housing and valve body acting to limit turning movement of the valve body to half a revolution.

5. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body positioned in said transverse opening and manually rotatable in opposite directions through half a revolution, said valve body including end walls that seat in said transverse opening against one end of the housing and a central portion integral with said end wall, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces and closed at their ends by said end walls of the valve body, and a one-piece valve member slidably adjustable endwise of the valve body and including an outer end wall and two opposite bifurcated portions projecting laterally from the end wall, said bifurcated portions having two opposite spaced inner curved surfaces which fit closely in the aforesaid pockets of the valve body and two spaced oppositely arranged outer cylindrically curved surfaces which fit closely against said cylindrical walls of the transverse opening in the housing, the inner end walls of said bifurcated portions each forming one end of an adjustable pocket in the valve body, and a finger operating portion on the outer end of said valve member.

6. A powder dispenser comprising a housing including a central portion having an inlet opening at the top, a threaded container engaging collar surrounding said inlet opening and permanently attached to said central portion of the housing, the housing having an outlet opening at the bottom and a transverse opening defined by cylindrical walls, a one-piece valve body positioned in said transverse opening and manually rotatable in opposite directions through half a revolution, said valve body including end walls that seat in said transverse opening against one end of the housing and a central portion integral with said end wall, the valve body being provided with two oppositely arranged hollow portions having spaced cylindrical outer surfaces fitting closely against the cylindrical walls of said transverse opening and the valve body having two oppositely arranged curved walls forming pockets and disposed between the aforesaid cylindrical outer surfaces and closed at their ends by said end walls of the valve body, and a one-piece valve member slidably adjustable endwise of the central portion of the valve body and including an outer end portion and two opposite bifurcated portions projecting laterally from the end wall, said bifurcated portions having two opposite spaced inner curved surfaces which fit closely in the aforesaid pockets of the valve body and two spaced oppositely arranged outer cylindrically curved surfaces which fit closely against said cylindrical walls of the transverse opening in the housing, the inner end walls of said bifurcated portions each forming one end of an adjustable pocket in the valve body, one of said bifurcated portions having endwise spaced retaining recesses on its inner surface, yieldable retaining means on said central portion of the valve body selectively engaging said recesses and acting to hold the valve member in adjusted position on the valve body, cooperating stop means on the housing and valve body acting to limit movement of the valve body to half a revolution, and a finger operating portion on the outer end of said valve member.

References Cited in the file of this patent
UNITED STATES PATENTS

| Number | Name | Date |
|---|---|---|
| 183,684 | Klinkermann | Oct. 24, 1876 |
| 1,560,824 | Karraz et al. | Nov. 10, 1925 |
| 1,852,198 | Bemis | Apr. 5, 1932 |
| 1,982,917 | Lothrop et al. | Dec. 4, 1934 |
| 2,005,029 | Field | June 18, 1935 |
| 2,135,665 | Hoban | Nov. 8, 1938 |